(12) United States Patent
Bala et al.

(10) Patent No.: US 7,903,291 B2
(45) Date of Patent: Mar. 8, 2011

(54) UV ENCRYPTION VIA INTELLIGENT HALFTONING

(75) Inventors: Raja Bala, Webster, NY (US); Shen-ge Wang, Fairport, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 589 days.

(21) Appl. No.: 12/013,664

(22) Filed: Jan. 14, 2008

(65) Prior Publication Data

US 2009/0180152 A1 Jul. 16, 2009

(51) Int. Cl.
*H04N 1/52* (2006.01)
*B41M 3/10* (2006.01)
*B42D 15/00* (2006.01)

(52) U.S. Cl. .......... 358/3.28; 358/534; 358/536; 283/92; 283/113; 283/114

(58) Field of Classification Search ................ 358/3.28, 358/3.06, 3.13, 3.2, 534–536; 283/85, 92, 283/113, 114

See application file for complete search history.

(56) References Cited

U.S. PATENT DOCUMENTS

| | | | |
|---|---|---|---|
| 5,828,463 A | 10/1998 | Delabastita | |
| 6,252,971 B1 * | 6/2001 | Wang | 382/100 |
| 7,286,682 B1 * | 10/2007 | Sharma et al. | 382/100 |
| 2007/0139681 A1 | 6/2007 | Eschbach et al. | |
| 2007/0262579 A1 | 11/2007 | Bala et al. | |
| 2007/0264476 A1 * | 11/2007 | Bala et al. | 428/195.1 |
| 2008/0199785 A1 * | 8/2008 | Bala et al. | 430/5 |

(Continued)

FOREIGN PATENT DOCUMENTS

| | | |
|---|---|---|
| EP | 0953939 | 11/1999 |
| WO | WO03005291 | 1/2003 |

OTHER PUBLICATIONS

European Search Report for Application No. EP 09 15 0382.

(Continued)

*Primary Examiner* — Scott A Rogers
(74) *Attorney, Agent, or Firm* — Fay Sharpe LLP

(57) ABSTRACT

A method for encryption of a digital watermark by intelligent halftoning includes receiving image data that define at least a portion of a document to be printed in terms of at least three halftone images corresponding respectively to three printing colorants, each of the three halftone images comprising a plurality of halftone cells. The image data are modified by phase-shifting some of the halftone cells of at least one of the halftone images relative to the other halftone images to encode a watermark within the portion of the document such that the at least one phase-shifted halftone image includes a phase-shifted region and a non-phase-shifted region. The modified image data are used to print the portion of the document on a substrate that will fluoresce when subjected to UV illumination. The printed portion of the document includes a first printed pattern resulting from the phase-shifted region and a second printed pattern resulting from the non-phase-shifted region. The first and second patterns of the printed portion of the document appear substantially similar when the portion of the document is viewed in visible light, and appear dissimilar when the portion of the document is viewed in UV light such that the watermark encoded in the modified image data is perceptible when the portion of the document is viewed in UV light and is hidden when the portion of the document is viewed in visible light.

14 Claims, 10 Drawing Sheets

U.S. PATENT DOCUMENTS

2008/0297851 A1* 12/2008 Bala et al. .................... 358/3.28
2008/0299333 A1* 12/2008 Bala et al. ...................... 428/29
2009/0060258 A1*  3/2009 Wang et al. ................... 382/100
2009/0060261 A1*  3/2009 Wang ........................... 382/100
2009/0122349 A1*  5/2009 Bala et al. .................... 358/3.28

OTHER PUBLICATIONS

Wang, "Uniform rosette for moire-free color halftoning", Color Imaging XII: Processing, Hardcopy and Applications, vol. 6493, 2007, pp. 1-11, XP002519462.

* cited by examiner

UV ENCRYPTION VIA INTELLIGENT HALFTONING

BACKGROUND

Security is an important concern in the realm of documents and digital production and/or reproduction of same. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a digital "watermark" using only conventional paper and toner or ink. A digital watermark is defined as information, for example one or more letters, words, symbols or patterns, that is at least partially (preferably fully or at least substantially) hidden in a printed image under normal viewing conditions but that is more clearly discernable under certain specialized viewing conditions. Unauthorized reproduction of documents including such digital watermarks typical degrades or obscures the digital watermark, which can aid in detection of counterfeit documents.

A fluorescence mark is one example of a known digital watermark. Methods and systems are known for including fluorescence marks in printed documents using conventional papers (e.g., ordinary "copy paper" or "printer paper") and ordinary inks/toners (e.g., CMYK ink/toner), specifically by using metameric colorant mixtures. Under visible lighting conditions (e.g., electromagnetic radiation wavelengths of about 400-700 nanometers (nm), the different colorant mixtures that are printed on respective adjacent portions of the paper together define an overall printed document region that appears substantially uniform in color. Under ultraviolet (UV) lighting (e.g., electromagnetic radiation wavelengths shorter than about 400 nm), these different colorant mixtures exhibit different UV absorption and, thus, different suppression of UV fluorescence of the optical brightening agents used in conventional printing/copying papers such that the region printed with the colorant mixture that suppresses less of the substrate fluorescence appears as a lighter/brighter region while the adjacent area printed with the colorant mixture that strongly suppresses substrate fluorescence appears as a darker region. These contrast variations under UV lighting are used to create watermark patterns, e.g., numbers, letters, symbols, shapes.

An example of this is shown in FIG. 1, wherein a colorant mixture "B" is selected and applied to patch area BP which, in this example, is shaped as the alphanumeric symbol "0". Further, a colorant mixture "A" is selected and applied to patch area AP arranged here in substantially close spatial proximity to patch area BP, and thereby providing a background around patch area BP. Both colorant mixture A and colorant mixture B are comprised of a suitably selected colorant or colorant mixtures, but colorant mixtures A and B are different mixtures. Each colorant mixture A or B may be, for example, either a single CMYK colorant or any mixture of CMYK colorants. In the illustrated example, colorant mixture A will be selected so as to provide higher UV absorption (greater substrate fluorescence suppression) than that selected for colorant mixture B. The colorant mixtures A and B will also be selected to match each other closely in their average color and luminance when viewed under visible light conditions. As shown at UV in FIG. 1, under UV lighting conditions, patch BP will appear brighter as compared to patch AP, due to the relatively limited suppression of the fluorescence of the optical brightening agents in the paper substrate as compared to the patch AP, thus forming a watermark W1. In contrast, under visible light conditions as shown at VIS, patches AP,BP are at least substantially indistinguishable. By way of example, an approximate 50% gray color may be realized with a halftone of black (K) colorant only and used for colorant mixture B to print patch BP. This may then be color-matched against a colorant mixture comprising yellow (Y), cyan (C), and magenta (M) that yield a similar approximate 50% gray color, A which is used to print the patch AP. In general, colorant mixture A will cover more of the paper, thus providing much higher suppression of native substrate fluorescence as compared to the patch BP, so that under UV lighting conditions, the patch BP will be readily apparent as a watermark W1. The two colorant mixtures will appear quite nearly identical "gray" under normal visible light viewing as shown at VIS in FIG. 1. Thus, when a document including such a fluorescence mark is subjected to UV illumination, the watermark W1 is revealed. A printed "look-alike" document or mere photocopy will not properly reproduce the watermark. Additional details and variations relating to fluorescence marks are disclosed in U.S. patent application Ser. No. 11/382,897 filed May 11, 2006 in the name of Raja Bala and Reiner Eschbach and entitled "Substrate Fluorescence Mask for Embedding Information in Printed Documents" and U.S. patent application Ser. No. 11/382,869 filed May 11, 2006 in the name of Raja Bala and Reiner Eschbach and entitled "Substrate Fluorescence Pattern Mask for Embedding Information in Printed Documents" and the disclosures of both these applications are hereby expressly incorporated by reference into the present specification.

As noted, a correlation mark is another known watermarking technique. By way of example, as shown in FIG. 2, a checkerboard halftone pattern HP is printed on paper by a regular 45-degree cluster halftone screen and has 13 columns of halftone cells. Another checkerboard halftone pattern HP' covering an equal spatial area overall is printed on paper by a halftone screen having four slightly stretched columns C5-C8 in the middle section, such that the halftone pattern HP' has only 12 columns over the same spatial width as the pattern HP. The patterns HP and HP' are perceived as the same gray level to a human observer and the phase shift is substantially hidden under normal image viewing conditions. In the pattern HP', due to the pitch difference between the regular columns C1-C4,C9-C12 and the slightly stretched columns C5-C8, the phase, which represents the transition between white and black, has changed from "in phase" with the pattern HP, (0 radian phase shift), for columns C1-C4, to "opposite phase" ($\pi$ radian phase shift) for columns C9-C12, with varying, increasing phase shift for the stretched columns C5-C8. If a transparency key K is printed with the halftone pattern HP and overlaid with the paper-printed halftone pattern HP as shown at K+HP, the result is unchanged relative to the original printed pattern HP because the key K and printed pattern can be registered, solid-on-solid, blank-on-blank. In contrast, when the key K is overlaid with the phase-shifted pattern HP' as shown at K+HP', the original printed checkerboard pattern HP' gradually disappears in proportion to the phase difference between the pattern HP' and the key K moving from left to right in the image, until the checkerboard pattern HP' is completely black (or other solid color) where the pattern HP' and key K are opposite phase. The average reflectance is higher in the registered regions C1-C4 and lower in the partially phase-shifted regions C5-C8 and still lower in the opposite phase regions C9-C12. Therefore, if a portion of an image is encoded with $\pi$ radian phase-shifted halftone cells and immediately surrounding these $\pi$ radian phase-shifted halftone cells are halftone cells that are 0 radian phase-shifted, by overlapping a checkerboard pattern transparency key of the same spatial frequency, a high contrast watermark W2 can be defined by the low reflectance areas where the key and halftone pattern are out of phase (conversely, a watermark can be defined by the high reflectance areas where the key and printed document are in phase). Accordingly, a document can be printed in this manner to include a watermark that is completely or at least substantially undetectable until a corresponding transparency key is overlaid to reveal the phase-shifted halftone regions. Correlation marks are disclosed, e.g., in U.S. Pat. No. 6,252,971 to Wang entitled "Digital Watermarking Using Phase-Shifted Stoclustic Screens" which is also hereby expressly incorporated by reference into the present disclosure.

While both fluorescence marks and correlation marks are highly effective, a need has been identified for a watermark that is less apparent under ambient lighting conditions and more apparent during a security check of the document, without requiring use of a separate transparency overlay key. Accordingly, the present development combines principles of fluorescence marks and correlation marks to achieve these goals as disclosed below.

SUMMARY

In accordance with one aspect of the present development, a method for encryption of a digital watermark by intelligent halftoning includes receiving image data that define at least a portion of a document to be printed in terms of at least three halftone images corresponding respectively to three printing colorants, each of the three halftone images comprising a plurality of halftone cells. The image data are modified by phase-shifting some of the halftone cells of at least one of the halftone images relative to the other halftone images to encode a watermark within the portion of the document such that the at least one halftone image includes a phase-shifted region and a non-phase-shifted region. The modified image data are used to print the portion of the document on a substrate that will fluoresce when subjected to UV illumination. The printed portion of the document includes a first printed pattern resulting from the phase-shifted region and a second printed pattern resulting from the non-phase-shifted region. The first and second patterns of the printed portion of the document appear substantially similar when the portion of the document is viewed in visible light, and appear dissimilar when the portion of the document is viewed in UV light such that the watermark encoded in the modified image data is perceptible when the portion of the document is viewed in UV light and is hidden when the portion of the document is viewed in visible light.

In accordance with another aspect of the present development, a system for printing a document with a watermark includes means for receiving image data that define at least a portion of a document to be printed in terms of at least three halftone images corresponding respectively to three printing colorants, each of the three halftone images comprising a plurality of halftone cells. The system also includes means for modifying the image data by phase-shifting some of the halftone cells of at least one of the halftone images relative to the other halftone images to encode a watermark within the portion of the document, such that the at least one phase-shifted halftone image includes a phase-shifted region and a non-phase-shifted region. The system further includes means for printing the portion of the document on a substrate that will fluoresce when subjected to UV illumination according to the modified image data, wherein printed portion of the document includes a first printed pattern resulting from the phase-shifted region and a second printed pattern resulting from the non-phase-shifted region, and wherein the first and second patterns of the printed portion of the document appear substantially similar when the portion of the document is viewed in visible light, and appear dissimilar when the portion of the document is viewed in UV light such that the watermark encoded in the modified image data is perceptible when the portion of the document is viewed in UV light and is hidden when the document is viewed in visible light.

In accordance with another aspect of the present development, a printed color document includes three or more colorants printed on a substrate that will fluoresce when subjected to UV illumination. One of the colorants is rendered with a phase-shifted halftone in selected regions that encode a watermark and the other colorants are rendered with halftones that serve as a distracting pattern obscuring the visibility of the phase shifted regions with respect to the non-phase-shifted regions under visible light conditions, but allowing the phase shifted regions to be visibly distinguished from the non-phase-shifted regions when the printed document is subjected to UV light.

DETAILED DESCRIPTION

Figure 1:
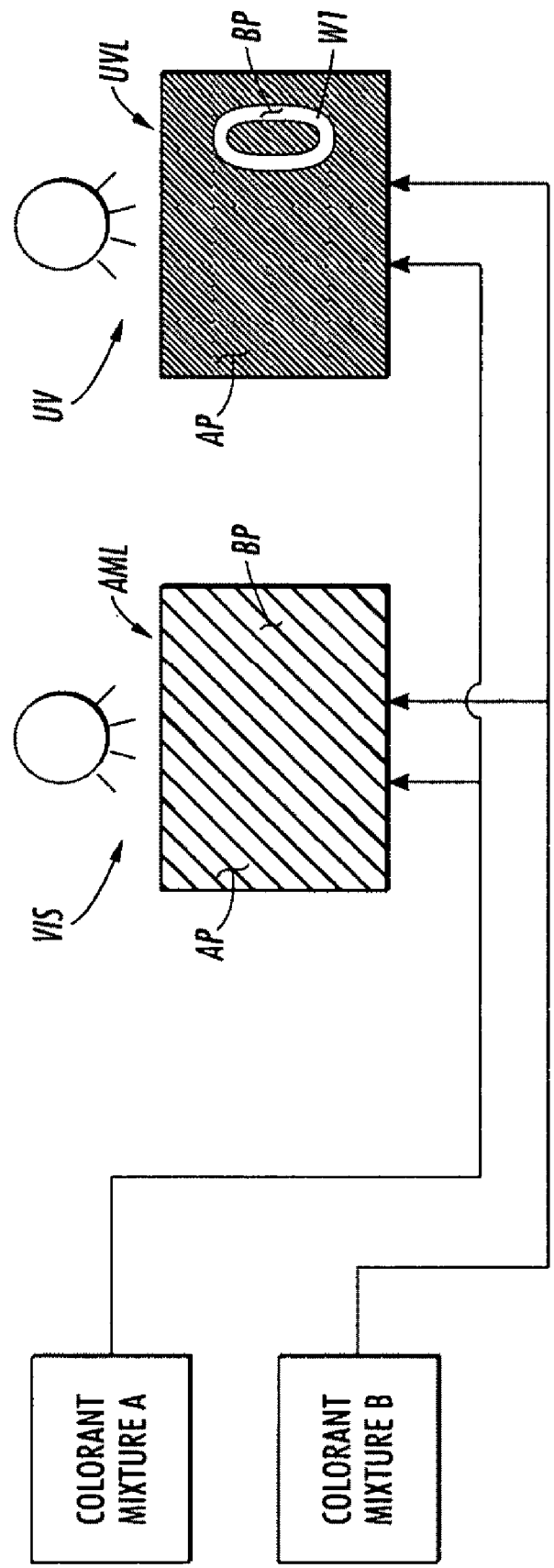
FIG. 1 (prior art) diagrammatically discloses the inclusion of a fluorescence mark in a printed document.
Figure 2:
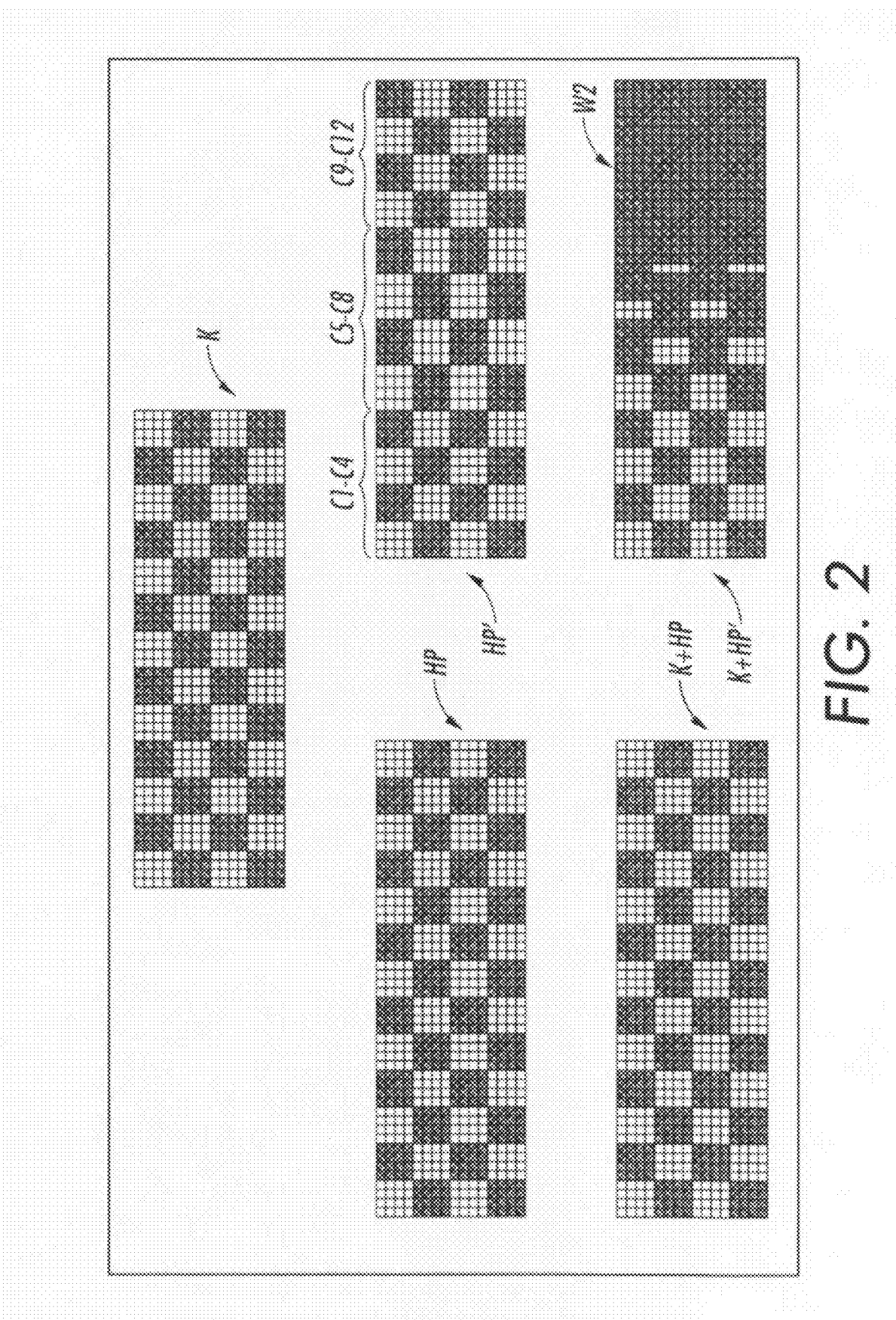
FIG. 2 (prior art) diagrammatically discloses the inclusion of a correlation mark in a printed document.
Figure 3:
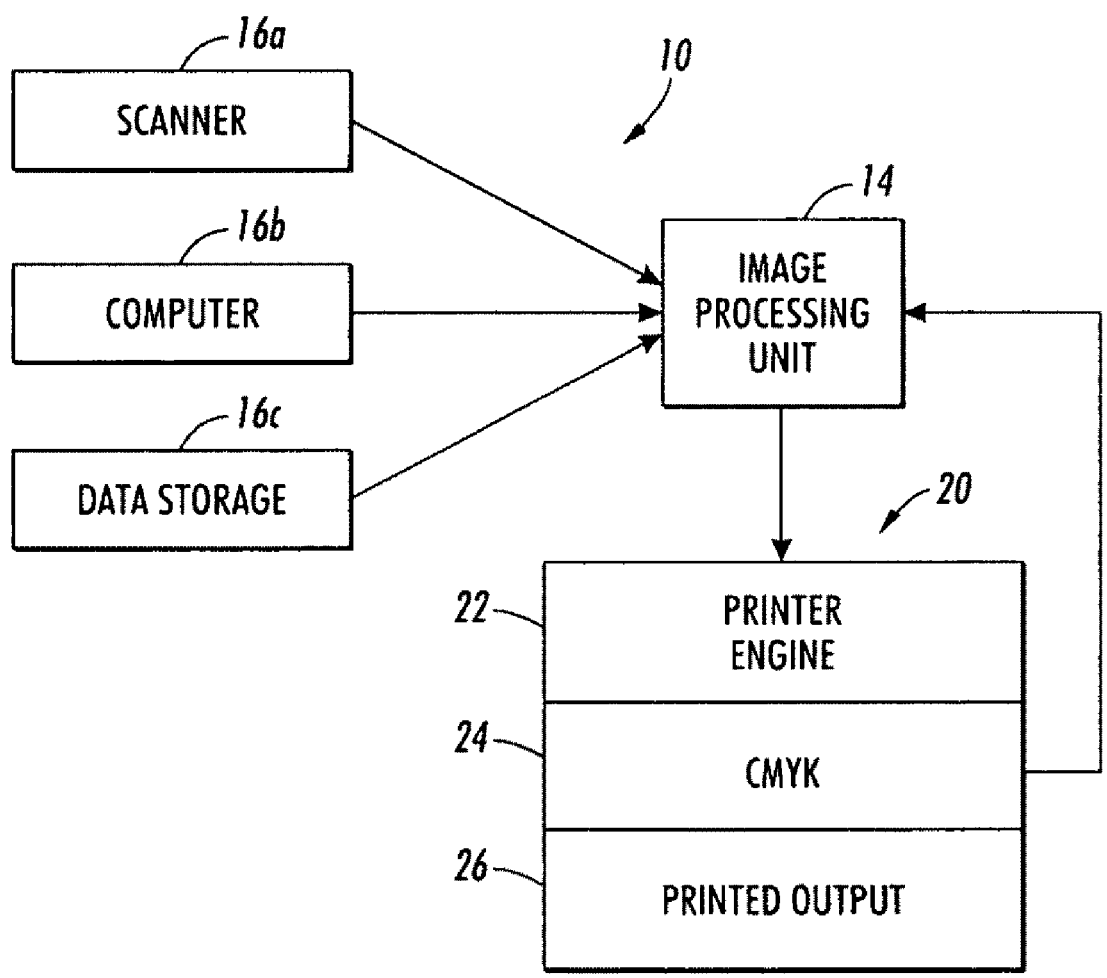
FIG. 3 discloses a system for implementing a method in accordance with the present development.

The system and/or method in accordance with the present development is/are preferably implemented in a printing system such as any commercially available multi-colorant ("color") printer, which can be provided as part of a printing and/or reproduction apparatus. Typically, the printer implements a CMYK color space and includes a xerographic printer engine although the present development is applicable to other printing methods such as ink-jet. FIG. 3 illustrates one example of an apparatus for implementing a method in accordance with the present development. The apparatus 10 comprises an image processing unit (IPU) 14 for carrying out the digital image processing operations disclosed herein. The IPU 14 is defined by electronic circuitry and/or software that is dedicated to digital image processing and/or can comprise a general purpose computer programmed to implement the image processing operations disclosed herein. The IPU 14 is adapted to receive image data from a source such as a scanner 16a, computer 16b (e.g., a digital front-end (DFE)), and/or data storage 16c or another source that is part of the apparatus 10 and/or that is operably connected to the IPU 14 through a network or other means. The apparatus 10 comprises an image output or printing unit 20 including a xerographic, ink-jet, or other print engine 22 for printing the image data on paper, a transparency, or another recording medium using toner and/or ink as is known in the art, using the CMYK or other multi-colorant color space 24. The printer unit 20 further comprises a printed output station 26 for physical output of the final printed product such as printed paper, transparencies or other recording media sheets. Examples of suitable commercially available systems 10 include, but are not limited to, the Phaser™, WorkCentre™, DocuColor™, and iGen3™ printing/copying/digital press systems available from Xerox Corporation.

Figure 4:
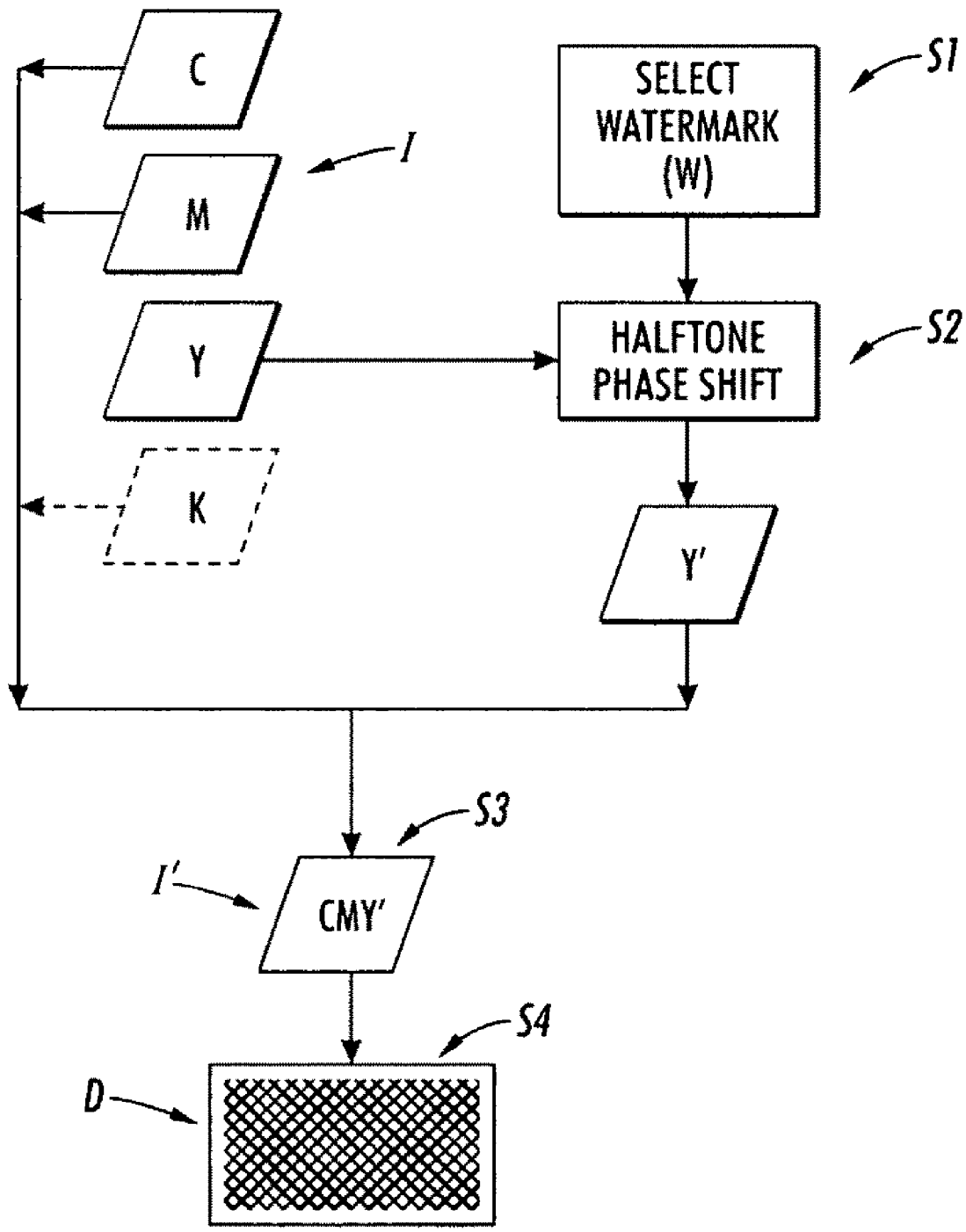
FIG. 4 is a flow chart that discloses UV encryption via intelligent halftoning in accordance with the present development.

FIG. 4 discloses UV encryption via intelligent halftoning in accordance with the present development, using the system of FIG. 3 or the like. As is generally known in the art, an electronic digital image document D to be printed at the image printing unit 20 comprises multiple monochromatic binary images or separations such as the illustrated cyan C, magenta M, yellow Y, and black K separations (the black separation K is optional for implementing the present development and thus is shown in broken lines and not further discussed). As shown at S1, a watermark W to be encoded in the digital image document I is selected and input to the IPU 14. The selected watermark must be or be converted to a low-frequency watermark, e.g., a slowly varying pattern or symbol encompassing multiple halftone cells, because the present development relies only on phase shifts in one of the halftone separations to encode the watermark, and such a method cannot be used to encode fine lines or like high-frequency data. In the preferred embodiment, the yellow separation Y is chosen for phase-shifting. The binary image defining the yellow separation Y of the electronic image document I is thus input to the IPU 14. In one example, the watermark W is selected and input to the IPU 14 as a text string of one or more characters, and the IPU converts the text string to a low-frequency binary image suitable for being encoded in the digital image document I.

In the IPU 14, the selected watermark W is encoded as shown at S2 in only the yellow separation Y of the digital image document I to define a new yellow separation Y', i.e., Y'=Y+W. In particular, the halftone cells of the yellow separation Y are modified such the halftone cells located to coincide spatially with the selected low-frequency watermark W are shifted in phase by a certain amount, while the remainder of the halftone cells of the yellow separation are shifted in phase by a different amount. In one example, the halftone cells of the yellow separation Y that are located to coincide spatially with the selected low-frequency watermark W are defined in the modified yellow separation Y' using non phase-shifted (i.e., 0 radian phase-shifted) halftone cells, while the remainder of the halftone cells of the yellow separation Y are defined in the modified yellow separation Y' to be opposite phase, i.e., $\pi$ radian phase-shifted. The non-yellow C,M, and optional K separations of the color image document I are not altered as part of the watermark encoding process.

The selected watermark is encoded in a constant color region (i.e., fixed contone digital input region) of the digital image document I, which could be the entire spatial extent of the digital image document or only a band or other portion thereof. In one example, a 50% digital input level for the cyan C, magenta M, and yellow Y separations is used, but other digital input levels are contemplated and fall within the scope of the present development, provided they result in output of a printed constant color region.

As shown at S3, the watermarked image I' comprises the separations CMY' and is then printed as a document D as shown at S4 in a conventional manner using the image printing unit 20, i.e., using the separation data CMY' and corresponding CMY inks/toners on conventional printing/copying paper or another substrate that includes optical brightening agents that fluoresce under UV illumination, where only the yellow separation Y' includes the phase-shift encoded watermark and is printed with such phase shifts.

Although the present development is described in FIG. 4 and elsewhere herein as being implemented using cyan C, magenta, M and yellow Y printer colorants, those of ordinary skill in the art will recognize that the development can be implemented using other combinations of three of more printer colorants, where two or more of the colorants are used to print a distracting pattern that obscures phase shifts in the third colorant under visible light conditions, but that allows the phase shifts in the third colorant to be perceived when the printed document is subjected to UV light. Yellow is one preferred color for the third colorant, but other colorants that exhibit low contrast in visible light but high contrast in UV light can be used for the third colorant, e.g., orange or light magenta.

The printing operation S4 is implemented using known halftoning techniques. For example, halftone screen rotation angles that will produce halftone rosettes as are generally known in the art. For example, the cyan C, magenta M, and yellow Y screen angles are 15, 75, and 45 degrees, respectively, with all screen frequencies being set equal, e.g., at 35.4 lines per inch. As such, the magenta screen angle is 60 degrees from the cyan screen angle, and the yellow screen angle is 30 degrees from the cyan screen angle. These settings will result in the cyan C and magenta M colorants defining a 2-colorant rosette pattern at 45 degrees and 35.4 lines per inch (the yellow colorant Y is also present in the rosette pattern but is obscured by the dominant 2-colorant cyan and magenta rosette pattern). There will be no low frequency 3-colorant moiré since the individual frequency vectors sum to zero.

Figure 5A:
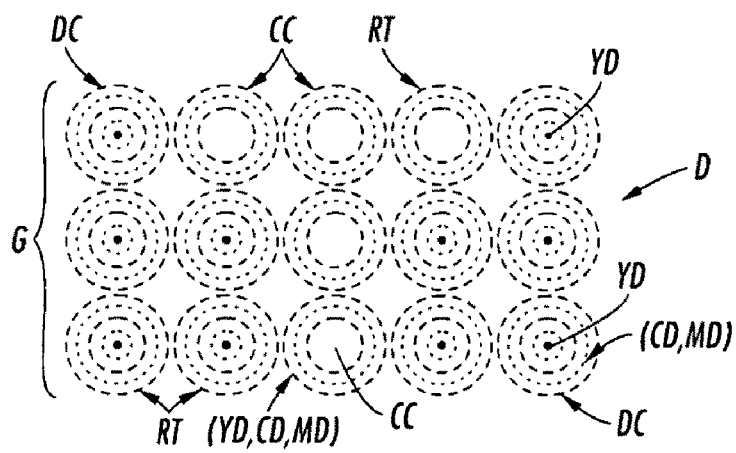
FIG. 5A diagrammatically illustrates a document including a watermark produced according to the present development.

FIG. 5A diagrammatically illustrates a constant color watermark region G of the printed digital image document D that comprises a watermark encoded via intelligent halftoning (i.e., phase shifts in only the yellow separation) as described above. The region G is defined by a group of halftone rosettes RT comprising cyan, magenta, and yellow halftone dots CD,MD,YD printed according to the separation data C,M,Y' (for ease of illustration, the rosettes RT are shown arranged in a uniform pattern, but those of ordinary skill in the art will recognize that rosettes RT can also be arranged in a non-uniform pattern that is not periodic or described by a fixed spatial frequency. Because the yellow separation Y' includes both phase-shifted and non-phase shifted halftone cells, the spatial location of the corresponding yellow halftone dots YD of the watermarked image region G vary relative to the cyan and magenta dots CD,MD depending upon which rosettes RT are considered. In particular, the $\pi$ radian phase-shifted regions of the yellow separation Y' result in the corresponding yellow halftone dots YD being offset relative to the cyan and magenta dots CD,MD in the rosette resulting in a dot-centered rosette DC, with a yellow halftone dot YD being located fully or substantially in the center of the rosette DC, surrounded by cyan and magenta halftone dots CD,MD and other phase-shifted yellow halftone dots YD. Conversely, the 0 radian phase-shifted regions of the yellow separation Y' result in the corresponding yellow halftone dots being in phase with the cyan and magenta halftone dots CD,MD so that the corresponding rosettes are clear-centered rosettes CC in which the cyan, magenta, and yellow halftone dots CD,MD,YD are all located in phase with each other so as to leave the rosette center open. The total ink/toner coverage on the paper substrate for phase-shifted (dot-centered) rosette DC is greater than a corresponding non phase-shifted (clear-centered) rosette CC, given that the yellow dots YD of the phase-shifted rosettes are located in areas of the paper or other substrate that would otherwise be at least partially uncovered with ink/toner.

Figure 5B:
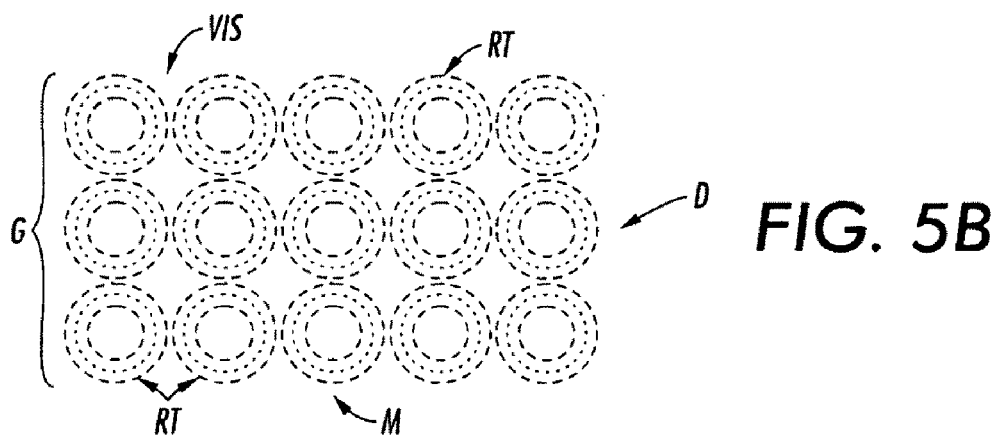
FIG. 5B shows the document of FIG. 5A as it appears to a human observer when subjected to visible light.

Referring now to FIG. 5B, the region G of the document D is shown as it will appear under visible light VIS to a human observer. In particular, the cyan and magenta halftone dots CD,MD result in a high-frequency 2 colorant moiré pattern M that at least substantially or completely obscures the watermark W encoded by the yellow halftone dots YD, due to the relatively low contrast and visibility of the yellow halftone dots YD as compared to the moiré pattern M.

Figure 5C:
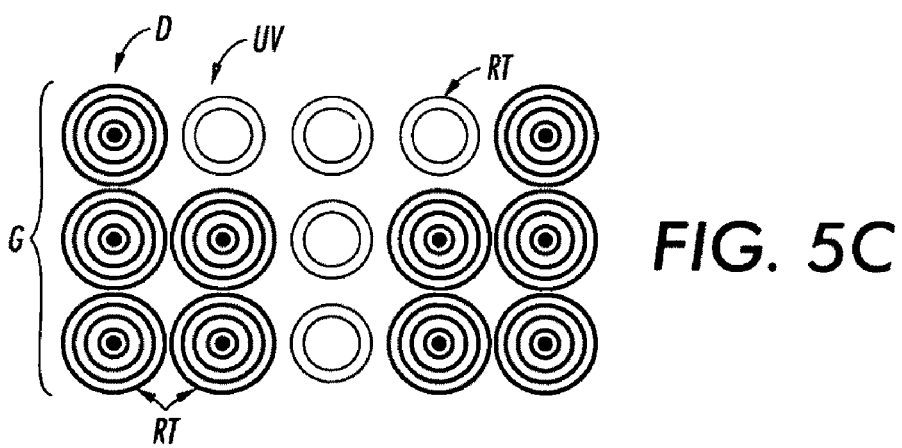
FIG. 5C shows the document of FIG. 5A as it appears to a human observer when subjected to UV light.

The same region G is shown in FIG. 5C as it will appear to a human observer under UV illumination, where the yellow halftone dots YD suppress substrate fluorescence and appear dark or black, together with the cyan and magenta halftone dots CD,MD that also appear dark or black. As such, phase-shifted (dot-centered) rosettes DC appear more dense and darker as compared to the non phase-shifted (clear-centered). The phase-shifted halftone cells of the yellow separation Y' correspond to the darker areas of the printed constant color region G, while the non phase-shifted halftone cells of the yellow separation Y' correspond to the lighter/brighter areas of the printed constant color region G so as to reveal the watermark W (a capital "T" in the illustrated example) due to substrate fluorescence. The yellow halftone dots YD that are out-of-phase relative to the cyan and magenta halftone dots CD,MD provide additive substrate coverage and, thus, greater UV fluorescence suppression as compared to yellow halftone dots YD that are in-phase relative to the cyan and magenta halftone dots CD,MD. The substrate coverage of the in-phase yellow halftone dots YD is partially redundant to the already present cyan and magenta halftone dots CD,MD.

Figure 6:
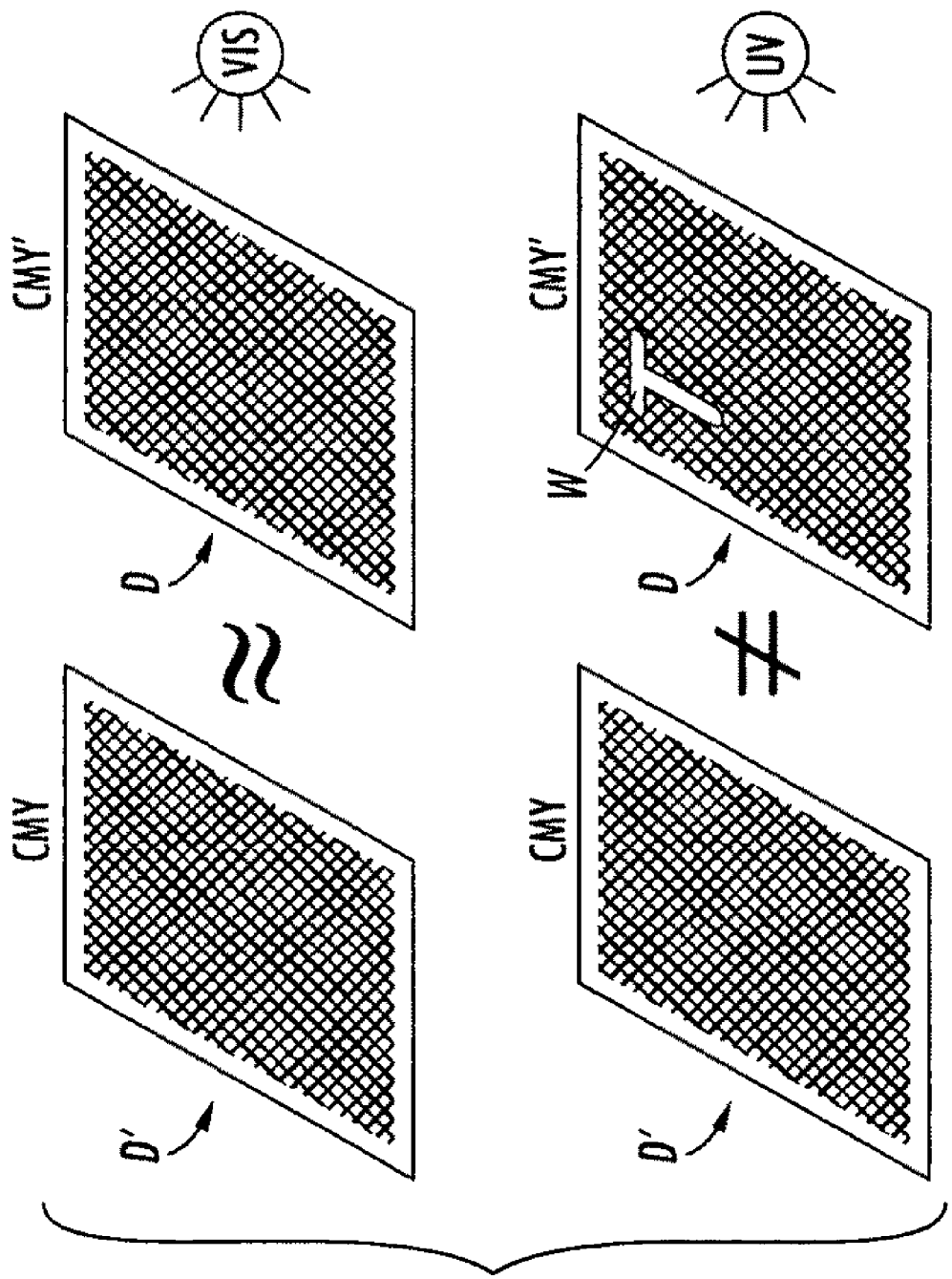
FIG. 6 illustrates a document produced in accordance with the present development and a process for decoding same to reveal its digital watermark.

In FIG. 6, a document D' is printed using the original C,M,Y separation data I of FIG. 4, while the document D is printed with a digital watermark W encoded by intelligent halftoning in accordance with the present development using the separation data CMY'. It can be seen that the documents D and D' will appear in visible light VIS to be at least substantially identical. When subjected to UV illumination, however, the documents D and D' appear very different, with the watermark W of the document D being revealed.

Figure 7:
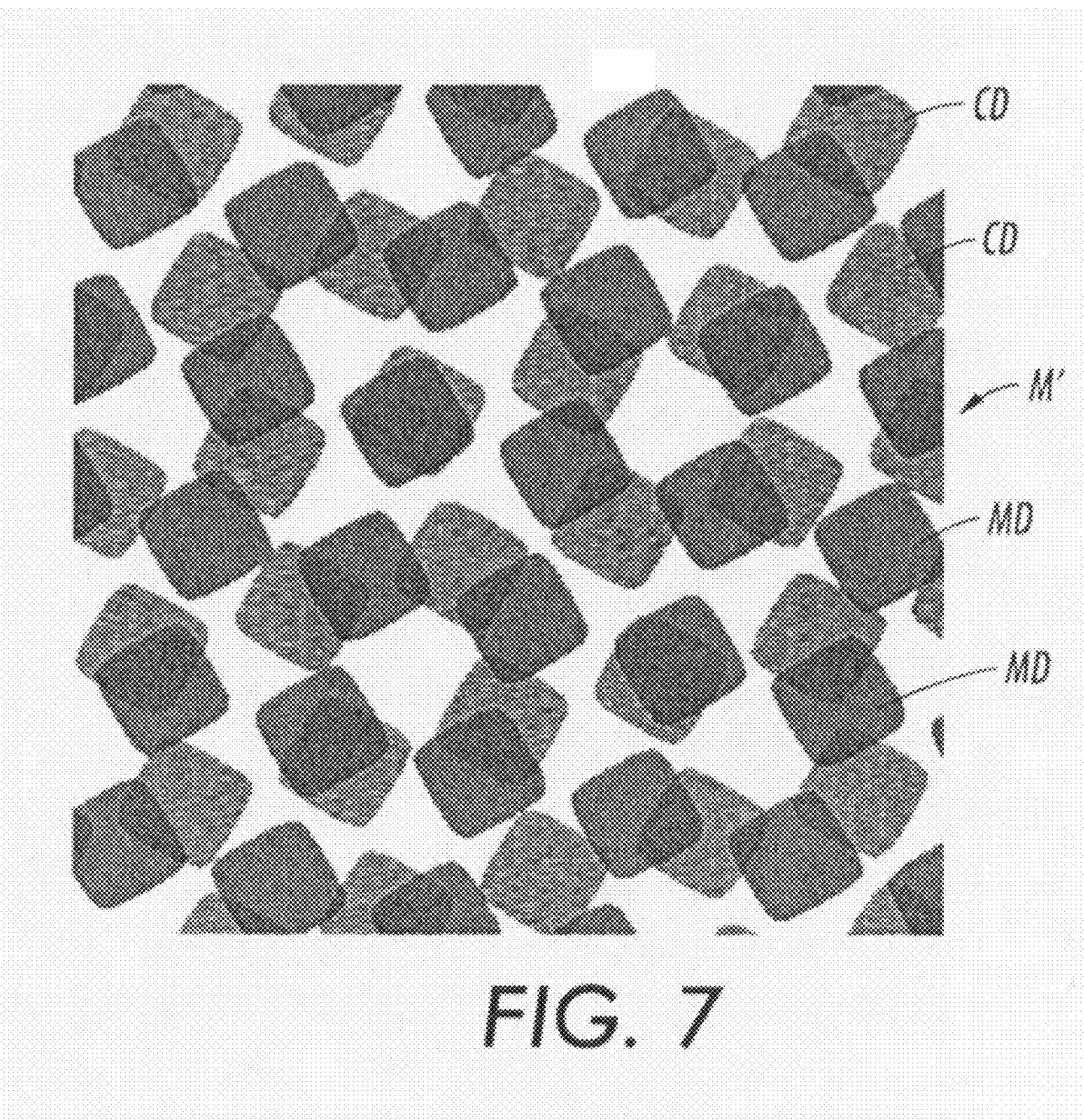
FIG. 7 illustrates a two colorant non-uniform rosette pattern.
Figure 8A:
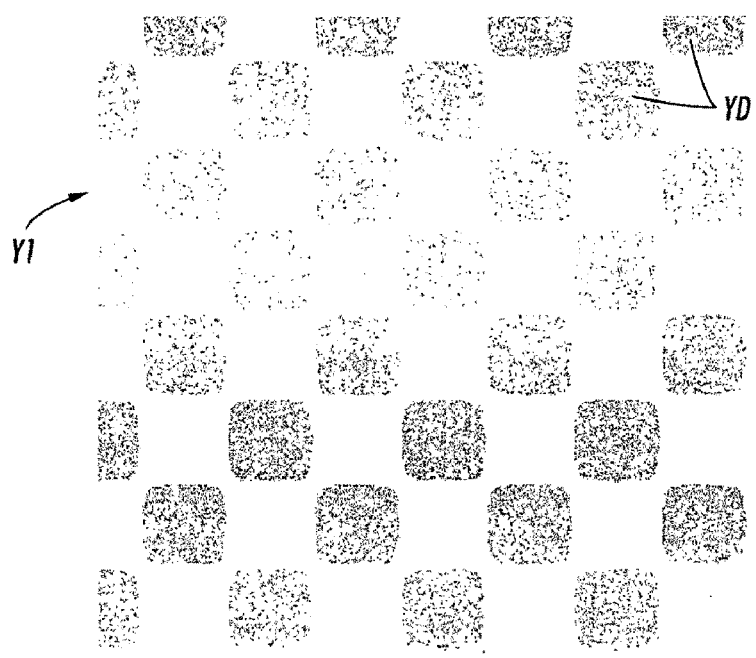
FIGS. 8A and 8B illustrate single colorant (e.g., yellow) halftone images that are $\pi$ radians phase-shifted relative to each other.
Figure 8B:
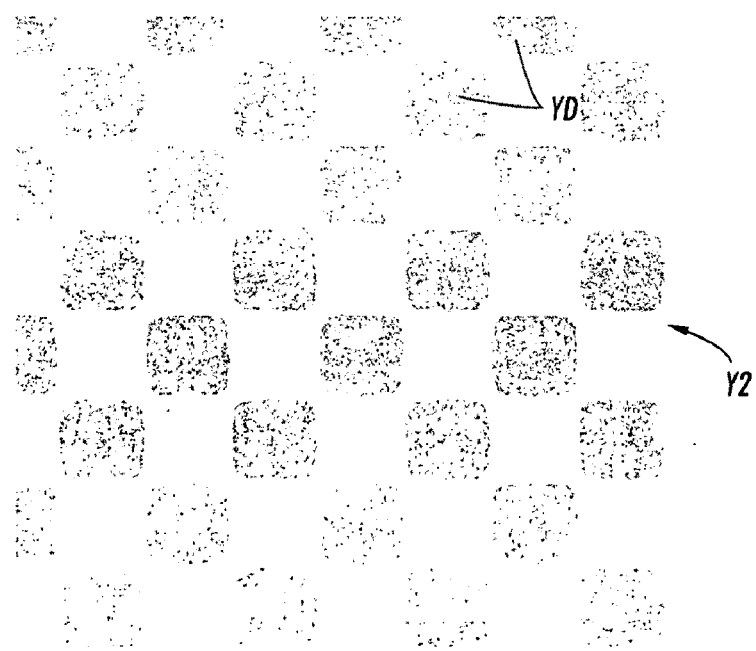
Figure 9A:
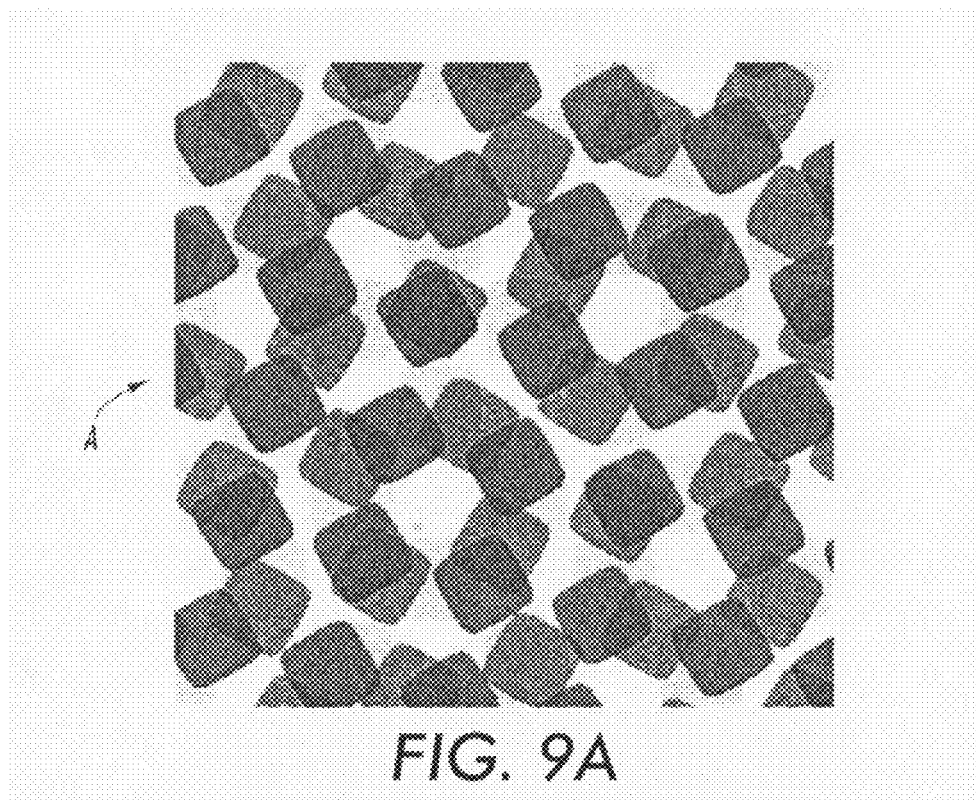
FIGS. 9A and 9B illustrate the rosette pattern of FIG. 7 combined with the halftone images of FIGS. 8A and 8B, respectively, as viewed in visible light.
Figure 9B:
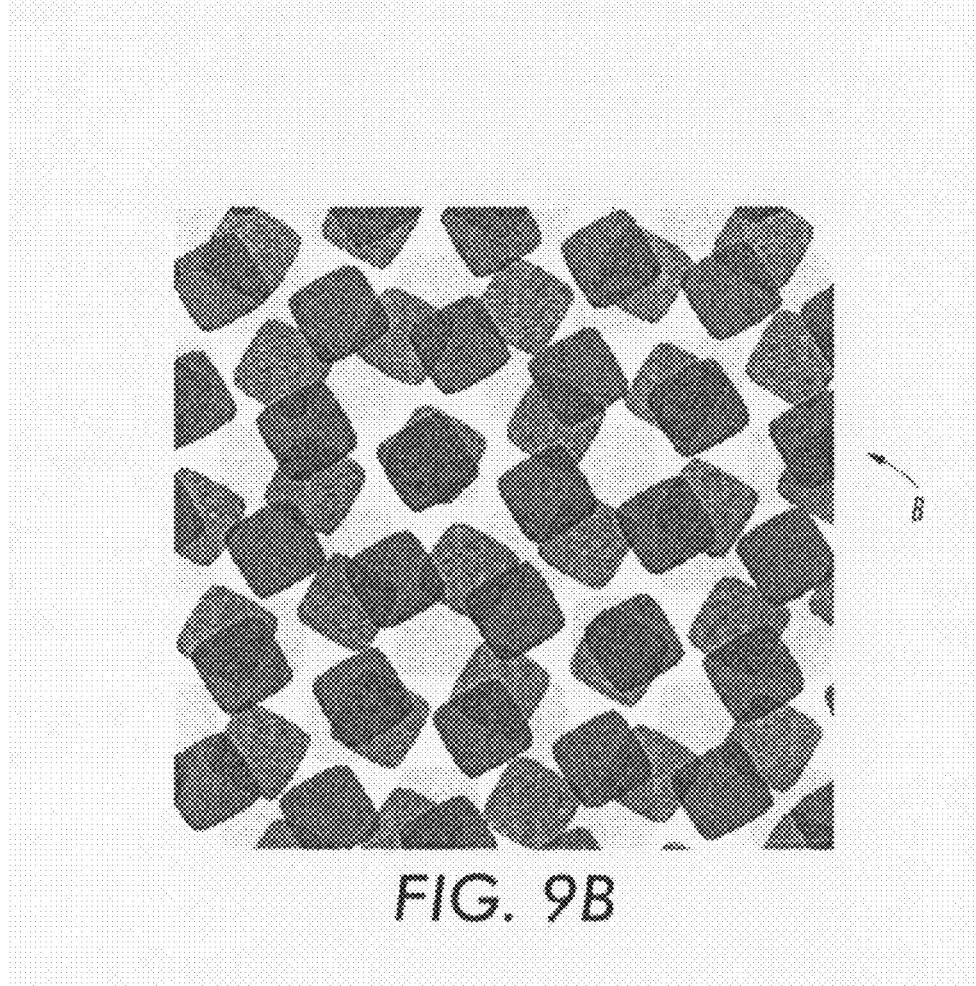
Figure 10A:
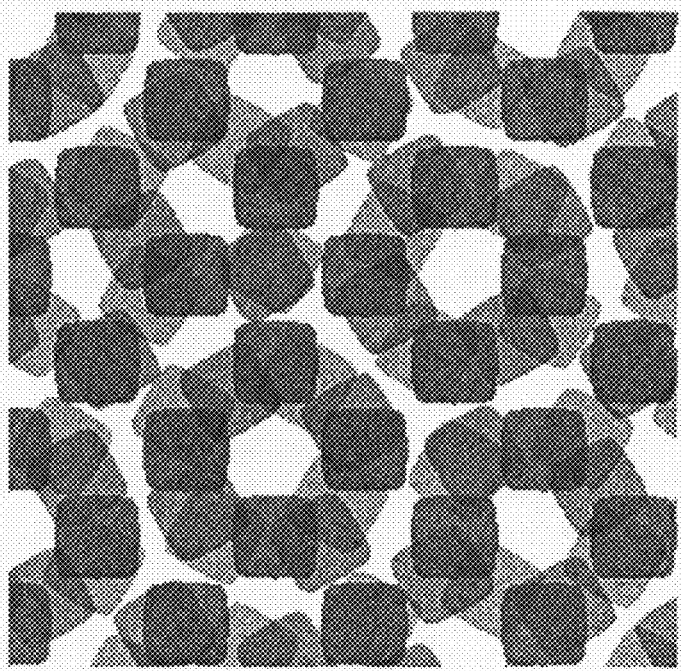
FIGS. 10A and 10B illustrate the rosette pattern of FIG. 7 combined with the halftone images of FIGS. 9A and 9B, respectively, as viewed in UV light.
Figure 10B:
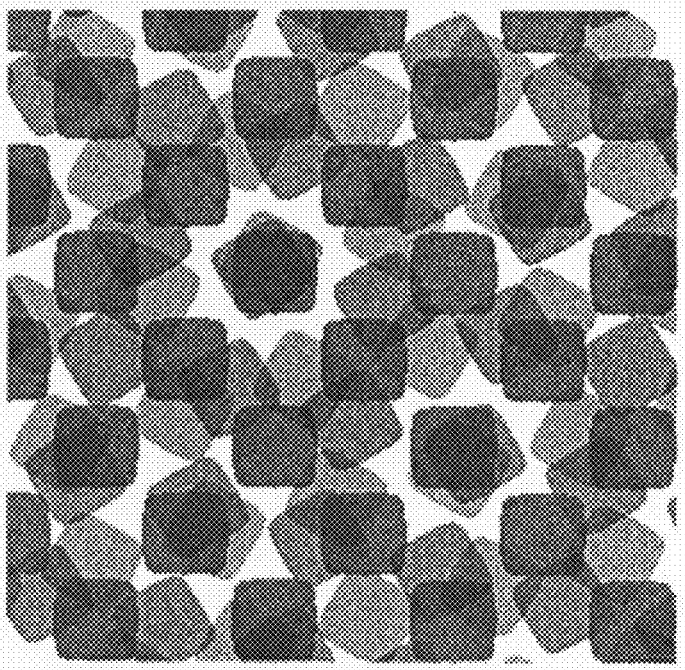

As noted above, the example shown in FIGS. 5A-5C should not be used to limit the present development to use of a uniform rosette moiré pattern M to conceal the phase-shift encoded watermark W. An alternative distracting pattern can be provided by a non-uniform rosette pattern or a stochastic pattern. FIG. 7 illustrates a two colorant non-uniform rosette pattern M' defined by e.g., cyan and magenta ink/toner halftone dots CD,MD. FIGS. 8A and 8B illustrate single colorant (e.g., yellow) halftone images Y1,Y2 defined by yellow ink/toner halftone dots YD. The halftone images of FIGS. 8A and 8B provide the same overall gray level but the halftone dots YD of the images Y1,Y2 are π radians phase-shifted relative to each other. As described above, such phase-shifting (within a single halftone image) is used to encode a watermark in the halftone image. FIGS. 9A and 9B respectively illustrate printed documents A and B wherein the distracting rosette pattern M' of FIG. 7 combined with the halftone images Y1,Y2 of FIGS. 8A and 8B, respectively, as viewed in visible light. In visible light, it is difficult to discern any difference in the overall appearance of the printed documents A and B of FIGS. 8A and 8B due to the combination of the low contrast of the yellow halftone images and the distracting two-colorant non-uniform rosette pattern M'. Under UV light, however, as represented at FIGS. 10A and 10B, it becomes apparent that the printed document B includes greater substrate coverage and, thus, greater suppression of substrate fluorescence so as to appear darker than printed document A. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for encryption of a digital watermark by intelligent halftoning, said method comprising:
   receiving image data that define at least a portion of a document to be printed in terms of at least three halftone images corresponding respectively to three printing colorants, each of said three halftone images comprising a plurality of halftone cells;
   modifying said image data by phase-shifting some of the halftone cells of at least one of said halftone images relative to the other halftone images to encode a watermark within said portion of said document, such that said at least one halftone image includes a phase-shifted region and a non-phase-shifted region;
   using said modified image data to print said portion of said document on a substrate that will fluoresce when subjected to UV illumination, wherein said printed portion of said document includes a first printed pattern resulting from the phase-shifted region and a second printed pattern resulting from the non-phase-shifted region;
   wherein said first and second patterns of said printed portion of said document appear substantially similar when said portion of said document is viewed in visible light, and appear dissimilar when said portion of said document is viewed in UV light such that said watermark encoded in said modified image data is perceptible when said portion of said document is viewed in UV light and is hidden when said portion of said document is viewed in visible light.

2. The method as set forth in claim 1, wherein one of said at least three halftone images is a yellow halftone image corresponding to a yellow printing colorant, and wherein said phase-shifting step comprises phase-shifting some of the halftone cells of said yellow halftone image to define a selectively phase-shifted yellow halftone image.

3. The method as set forth in claim 2, wherein said step of phase-shifting some of the halftone cells of said yellow halftone image comprises shifting some of the halftone cells of said yellow halftone image by π radians relative to other halftone cells of said yellow halftone image.

4. The method as set forth in claim 2, wherein said at least three halftone images comprise said selectively phase-shifted yellow halftone image, a cyan halftone image and a magenta halftone image corresponding respectively to yellow, cyan and magenta printing colorants.

5. The method as set forth in claim 4, wherein said first and second printed patterns of said printed portion of said document comprise first and second rosette patterns.

6. The method as set forth in claim 5, wherein one of said first and second rosette patterns is clear-centered and the other of said rosette patterns is dot-centered.

7. The method as set forth in claim 6, wherein said first and second rosette patterns are either uniform or non-uniform rosette patterns.

8. The method as set forth in claim 7, wherein:
a clear-centered rosette is printed for each occurrence of a halftone cell of said phase-shifted yellow halftone image being in-phase with spatially corresponding halftone cells of said cyan and magenta halftone images; and,
a dot-centered rosette is printed for each occurrence of a halftone cell of said phase-shifted yellow halftone image being opposite phase with respect to spatially corresponding halftone cells of said cyan and magenta halftone images.

9. The method as set forth in claim 7, wherein said cyan and magenta halftone dots of said clear-centered and dot-centered rosettes define a moiré pattern that obscures phase-shifts said yellow halftone dots when said portion of said document is viewed in visible light.

10. The method as set forth in claim 1, wherein said portion of said document is a constant color region wherein said at least three halftone images each represent only a single digital input color level for said entire constant color region.

11. The method as set forth in claim 7, wherein said cyan halftone image, said magenta halftone image, and said selectively phase-shifted yellow halftone image are printed at first, second, and third screen rotation angles, respectively, to define said rosettes, wherein said second rotation angle is 60 degrees from said first rotation angle and said third rotation angle is 30 degrees from said first rotation angle.

12. A system for printing a document with a watermark, said system comprising:
means for receiving image data that define at least a portion of a document to be printed in terms of at least three halftone images corresponding respectively to three printing colorants, each of said three halftone images comprising a plurality of halftone cells;
means for modifying said image data by phase-shifting some of the halftone cells of at least one of said halftone images relative to the other halftone images to encode a watermark within said portion of said document, such that said at least one phase-shifted halftone image includes a phase-shifted region and a non-phase-shifted region;
means for printing said portion of said document on a substrate that will fluoresce when subjected to UV illumination according to said modified image data, wherein said printed portion of said document includes a first printed pattern resulting from the phase-shifted region and a second printed pattern resulting from the non-phase-shifted region, and wherein said first and second patterns of said printed portion of said document appear substantially similar when said portion of said document is viewed in visible light, and appear dissimilar when said portion of said document is viewed in UV light such that said watermark encoded in said modified image data is perceptible when said portion of said document is viewed in UV light and is hidden when said portion of said document is viewed in visible light.

13. A printed color document comprising three or more colorants printed on a substrate that will fluoresce when subjected to UV illumination, wherein one of the colorants is rendered with a phase-shifted halftone in selected regions that encode a watermark and the other colorants are rendered with halftones that serve as a distracting pattern obscuring the visibility of the phase-shifted regions with respect to the non-phase-shifted regions under visible light conditions, but allowing the phase-shifted regions to be visibly distinguished from the non-phase-shifted regions when the printed document is viewed under UV light.

14. The printed color document as set forth in claim 13, wherein the color document comprises at least cyan, magenta, and yellow colorants, wherein the watermark is encoded as halftone phase shifts in the yellow colorant and the distracting pattern is defined by the halftones used for the cyan and magenta colorants.

* * * * *